No. 663,460. Patented Dec. 11, 1900.
C. D. OLSEN & T. W. CARROLL.
TELEGRAPH REPEATER.
(Application filed Aug. 17, 1899.)
(No Model.) 2 Sheets—Sheet 1.

WITNESSES
M C Fowler
Wm Cleary Sullivan

INVENTORS:
Charles David Olsen and
Thomas William Carroll
By Alexander & Dowell
Attorneys

THE NORRIS PETERS CO., PHOTO-LITHO., WASHINGTON, D. C.

No. 663,460. Patented Dec. 11, 1900.
C. D. OLSEN & T. W. CARROLL.
TELEGRAPH REPEATER.
(Application filed Aug. 17, 1899.)

(No Model.) 2 Sheets—Sheet 2.

Witnesses
M. C. Fowler
W. Cleary Sullivan

Inventors:
Charles David Olsen and
Thomas William Carroll
by Alexander & Dowell
Attorneys

THE NORRIS PETERS CO., PHOTO-LITHO., WASHINGTON, D. C.

UNITED STATES PATENT OFFICE.

CHARLES DAVID OLSEN AND THOMAS WILLIAM CARROLL, OF DENVER, COLORADO.

TELEGRAPH-REPEATER.

SPECIFICATION forming part of Letters Patent No. 663,460, dated December 11, 1900.

Application filed August 17, 1899. Serial No. 727,564. (No model.)

*To all whom it may concern:*

Be it known that we, CHARLES DAVID OLSEN and THOMAS WILLIAM CARROLL, of Denver, Arapahoe county, Colorado, have invented certain new and useful Improvements in Telegraph-Repeaters; and we hereby declare that the following is a full, clear, and exact description thereof, reference being had to the accompanying drawings, which form part of this specification.

This invention is a telegraphic repeater for use on single-wire systems; and its objects are to increase the efficiency of such instruments, to prevent the shortening of signals caused by frequent repetition through repeaters, to simplify the instrument, using fewer magnets and requiring less battery to operate the instrument than those now in use, and to control the main-line cut-out lever by the second lever acting directly thereon without intermediate instruments or magnets which cause delay before proper action can be had.

By our improved instrument we obtain a much greater speed in forwarding messages than heretofore possible, and it is believed that our improvement will remedy the objections incident to previously-known repeaters and will be perfectly practical in operation, as well as simple in construction, economical in cost, easily adjusted, and the instrument can be used as an ordinary relay by providing suitable switches to bridge the main-line contact-points and open the auxiliary-magnet lines.

The accompanying drawings illustrate the best form of apparatus now known to us and the manner of using the same, and the invention is best summarized in the claims appended to the following description, in which reference is had to the accompanying drawings by letters of reference, and in said drawings—

Figure 1:
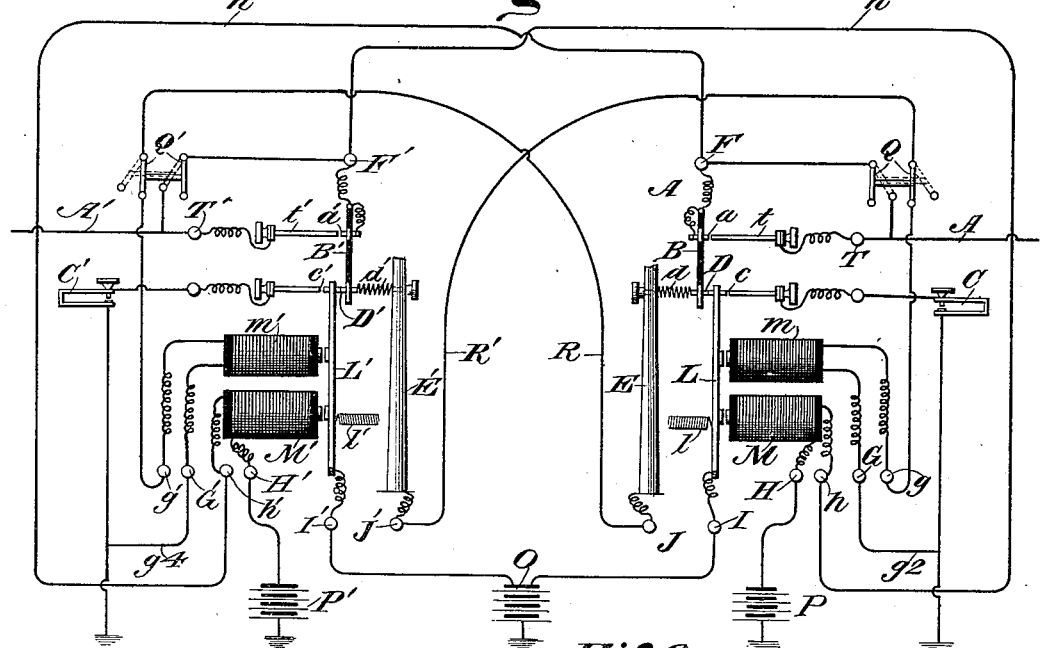
Figure 2:
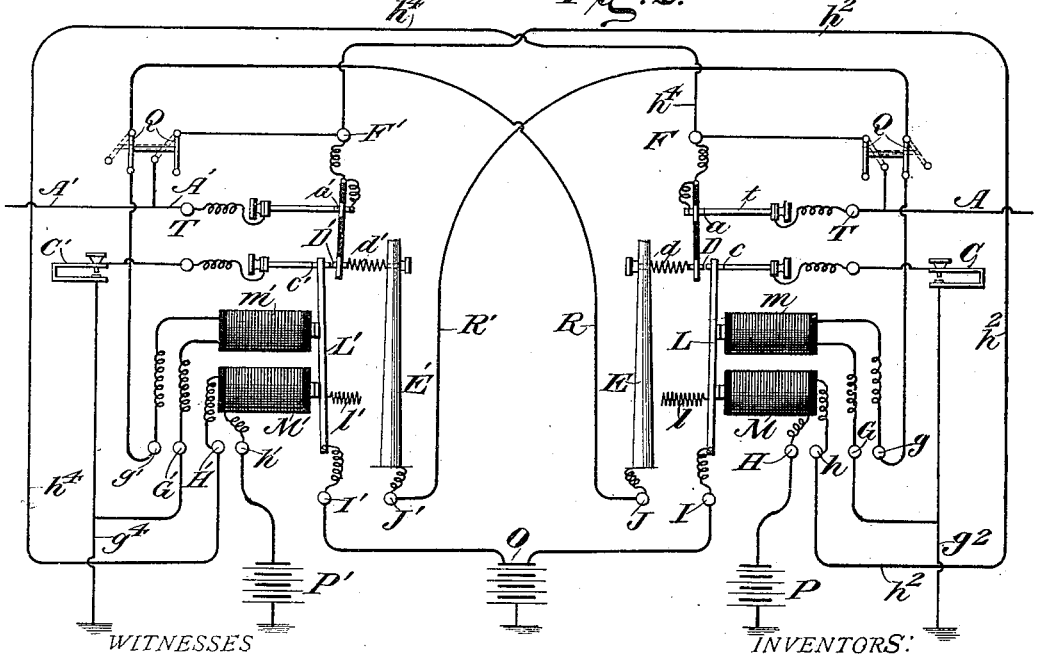
Figure 3:
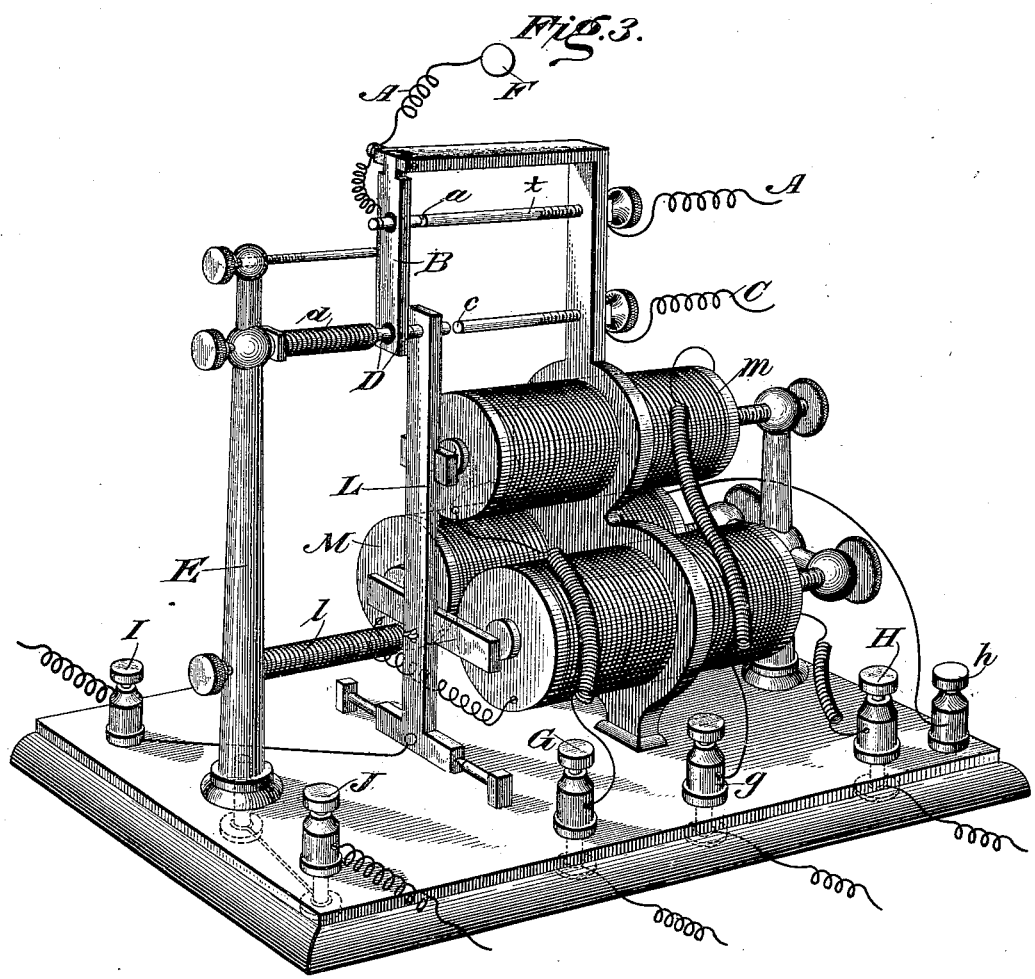

Figure 1 is a diagrammatic plan view of the complete instrument with the main line open. Fig. 2 is a similar view thereof with the main line closed. Fig. 3 represents one-half of the instrument, the other portion being the exact duplicate of that shown.

As the parts of the instrument are connected by wires, it is unnecessary that they be mounted upon the same base. They may be conveniently located with reference to each other as desired.

A A' designate the main-line wires connected to binding-posts T T', which in turn are connected to the contact-screws of the instruments $t$ $t'$, which are respectively opposite the contacts $a$ $a'$, secured on pivoted levers B B', and the contacts $a$ $a'$ are connected to screws F F', respectively. Screw F is connected by wire $h^4$ to the contact-post $h'$, which connects to one of the main magnets M', which in turn is connected to the binding-post H', and the latter to a battery P'. Contact F' connects by wire $h^2$ and post $h$ to the main magnet M, which is in turn connected by wire and post H with a battery P, batteries P P' being main batteries. The armatures of these magnets M M' are mounted on pivoted levers L L', respectively, which are controlled by the springs $l$ $l'$. The upper end of lever L lies between the contact D, carried on the lower end of lever B, and the contact $c$, which is suitably connected to the local sounder C, that is grounded by connection through a wire $g^2$, as shown. The upper end of lever L' lies between the contact D' on the lower end of lever B' and a contact $c'$, which is connected to a local sounder C', which is grounded by a connection through the wire $g^4$, as shown.

The lever B is connected by a push-spring $d$ to an upright post E, the spring $d$ being adapted to move lever B outward sufficiently to make contact between $a$ and $t$. When lever L makes contact with D, a current is established from the local battery O, through post I, lever L, contact D, spring $d$, posts E and J, wire R, post $g'$, a secondary magnet $m'$, post G', and wire $g^4$, to earth, as shown in Fig. 1. Similarly when lever L' makes contact with D' a current is established from local battery O, through post I', lever L', contact D', spring $d'$, pillar E', post J', wire R', post $g$, secondary magnet $m$ beside the main magnet M, thence through post G and wire $g^2$, to earth, as indicated in Fig. 1.

To save unnecessary repetition, we would here remark that duplicate parts bear the same reference in the prime. For instance, the parts E E', springs $g$ $g'$, levers B B', magnets M M', levers L L', and magnets $m$ $m'$ are duplicates in construction and in connections, as will be obvious from the drawings.

It will be noticed that the lever L carries two armatures respectively controlled by magnets M $m$.

In the operation of the apparatus the magnets M M' are energized alternately with the magnets $m$ $m'$, the magnets $m$ $m'$ being magnetized when the main line is open from the local battery O, while the magnets M M' are energized when the main line is closed from the main batteries P P'.

It will be observed by reference to Fig. 1 that levers L L' directly operate the levers B B', so that as soon as the main current is broken the magnets M M' are demagnetized and the levers L L' are released by the magnets. Being then moved by their springs $l$ $l'$, they will directly operate levers B B' and break the main-line contacts at $a$ $a'$, and they also break the local-sounder contacts at points $c$ $c'$, but will simultaneously establish the auxiliary-magnet circuits at points $d$ $d'$. One or the other instrument must be closed at all times, as main current is passing through its contact-points, waiting to be broken by operator at other end of line, if necessary.

The parts stand normally in the position shown in Fig. 2. When the current is sent through the main line A, it passes through contact $a$ and the continuation of the main line A around to the main magnet M' in the second instrument, energizing the same and causing lever L' to break the contact at D' and establish it at $c'$, whereby, first, a current is established from the local battery O to binding-post I', lever L', and the local sounder C', to the ground through wire $g^4$; second, another current is established through the local sounder C, from the battery O, through binding-post I, lever L, contact $c$, sounder C, and wire $g^3$, to the ground, and, third, at the same time a current is established from the main battery P, through the binding-post H, main magnet M, binding-post $h$, wire $h^2$, to the binding-post F', through the contact $a'$, to the main-line wire A'. Only one main circuit can be opened at one time. When the main-line circuit is broken, as indicated in Fig. 1, there is no current through the main magnets M M', nor through the sounders C C', as the contact is broken at points $c$ $c'$ by the springs $l$ $l'$ moving levers L L' away from the magnets; but circuits are simultaneously established from the local battery O, through the auxiliary magnets $m$ $m'$, the circuits dividing at battery O and one current going through post I, lever L, contact D, spring $d$, posts E and J and wire R, post $g'$, to magnet $m'$, and thence back to post G' and wire $g^4$ to the earth. The other current passes through battery O, to post I', the lever L', contact D', spring $d'$, posts E' and J', wire R', post $g$, to the magnet $m$, back to post G, and through wire $g^2$ to the earth. One instrument is always closed.

By means of the switch Q the operator can cut out the auxiliary magnets and establish direct connection between the main line A and the wire $h^4$, and by means of the switch Q' the magnets M $m'$ can be cut out and communication established directly between the wire A' and the wire $h^2$. These switches enable the main-line contacts to be bridged and the auxiliary-magnet lines to be opened, so that each instrument can be used singly or as an ordinary relay.

It will readily be seen that levers B B' are directly controlled by the levers L L', thus causing no loss of time in the transmission of signals. The auxiliary magnets $m$ $m'$ are preferably made with laminated cores to get more ready action for the levers L L', as the laminated cores magnetize and demagnetize readily, so as to hold levers L L' one at a time, as the case may be, properly when the main current is off. It will also be observed that the sounders C C' use the local current from the battery O, these sounders alternating with the auxiliary magnets $m$ $m'$ in the use of the local current. It will further be observed that the local sounders C C' may be disconnected or, in fact, entirely dispensed with, if desired, without affecting the operation of the repeater. By using two sets of levers—such as L and B and L' and B', as described—auxiliary magnets to operate or control the levers B B' are dispensed with, and thus no time is lost in repeating the signals, such as would be lost in magnetizing additional magnets for controlling the levers B B'.

In Figs. 1 and 2 we have illustrated the double switches Q Q', which are so arranged as to bridge the main-line contact and open auxiliary-magnet line, so as to enable each instrument to be used singly or as ordinary relays.

It will be observed in our repeater, first, that the main armature-levers L L' act directly upon the levers B B' instead of the latter being acted upon by separate magnets, the result being that the main-line current is broken directly by the action of the levers L L' upon the levers B B', causing no loss of time for signals to take place; second, in the same operation the levers L L' open the local sounder-line, and, third, at the same time close the auxiliary-magnet line, thereby holding the main levers L or L', as the case may be, by the auxiliary magnets $m$ or $m'$ while the main lines are open, only one instrument acting at any one time when repeating, and no two main-line currents are off, as that would be the same as an open circuit; fourth, another novel feature is that the local sounders and auxiliary magnets are controlled by the same battery and alternately use the current; and still another feature is should the sounder become disconnected this will not interfere with the repeating operation of the apparatus, as it can be used without the sounders.

It should be noted that when current from local source is not needed in actuating auxiliary magnet same is used to actuate local sounder, and that they alternate with each other.

As can readily be seen, in repeating one instrument is always closed, and the instrument is held closed (which makes it a repeater) alternately with auxiliary magnet and main-line magnet.

The operator upon closing the instrument to make signals energizes the main magnet of instrument under his control, thereby attracting armature and repeating signal in other line, and opens auxiliary-magnet line, demagnetizing auxiliary magnet of other instrument, whose armature now is held in contact by main-line current instead of local current; but if when the operator opens his circuit to make signal the instrument under his control did not close the auxiliary-magnet line before opening the main line he would also open his own line, as no current would be actuating auxiliary magnet. As will be seen, the main-line current before going to the instrument under his control first has to go through main contact-points of opposite instrument, which must always be closed and is held closed, as stated, alternately by auxiliary magnet and main-line magnet.

The auxiliary magnet must be powerful enough to do just as much as main current would do, and when not needed it is cut out at same instant that main-line current is cut in and on continuity-points.

When the main armature is drawn from magnets to back-stop, the auxiliary-magnet line is closed and the armature next comes in contact with main-line points, which stops the forward movement of small lever and main armature goes on, opening the auxiliary-magnet line, and closes local-sounder line. When armature returns, just the reverse occurs, which makes use of same current for sounder and auxiliary magnet. When sounder makes a signal down, it shows the main-line current is on, and consequently takes care of opposite instrument armature-lever, keeping it closed. When sounder makes upstroke, no current is on main line, and consequently auxiliary-magnet current must be used to keep armature-lever in closed position or otherwise the operator would find his own line open.

Having thus described our invention, what we therefore claim as new, and desire to secure by Letters Patent, is—

1. In a telegraphic repeater, the combination of two main magnets, two auxiliary magnets, and make-and-break devices for the main-magnet circuits and the auxiliary-magnet circuits, each device comprising a pivoted lever controlled by one main and one auxiliary magnet and a small pivoted movable lever controlled by the first lever and adapted to control the circuits of the other main and auxiliary magnets, substantially as and for the purpose described.

2. In a telegraphic repeater, the combination of two main magnets, and an electrical supply therefor, two auxiliary magnets, and an electrical supply therefor, one main and one auxiliary magnet forming a set, and make-and-break devices for the magnet-circuits in each set, each device comprising a pivoted lever carrying the armatures of both magnets in the set and a small pivoted movable lever controlled by the first lever, the device operated by one set of magnets controlling the circuits of the other set of magnets, substantially as and for the purpose described.

3. In a telegraphic repeater, the combination of the opposite sets of magnets, each set comprising a main and auxiliary magnet, and a make-and-break device for each set consisting of a lever adapted to be controlled by both the main and auxiliary magnet, and a small pivoted movable lever directly actuated by said main lever and carrying contacts whereby the main-magnet line is opened at the instant of closing the auxiliary-magnet circuit, or vice versa, the pivoted lever operated by one set of magnets controlling the circuits of the other set.

In testimony that we claim the foregoing as our own we affix our signatures in presence of two witnesses.

CHARLES DAVID OLSEN.
THOMAS WILLIAM CARROLL.

In presence of—
FRANK. J. CAVANAUGH,
JOHN M. KINNEAR.